United States Patent
Iacono

(10) Patent No.: US 7,340,254 B2
(45) Date of Patent: Mar. 4, 2008

(54) MEASUREMENT OPPORTUNITIES FOR A MOBILE UNIT OPERATING WITH A SWITCHED BEAM ANTENNA IN A CDMA SYSTEM

(75) Inventor: Ana Lucia Iacono, Garden City, NY (US)

(73) Assignee: Interdigital Technology Corporation, Wilmington, DE (US)

( * ) Notice: Subject to any disclaimer, the term of this patent is extended or adjusted under 35 U.S.C. 154(b) by 190 days.

(21) Appl. No.: 11/051,016

(22) Filed: Feb. 4, 2005

(65) Prior Publication Data
US 2005/0239464 A1    Oct. 27, 2005

Related U.S. Application Data

(60) Provisional application No. 60/541,968, filed on Feb. 5, 2004.

(51) Int. Cl.
*H04Q 7/20* (2006.01)
(52) U.S. Cl. ............ 455/442; 455/63.4; 455/101; 455/443; 455/525; 455/575.7; 370/331; 370/332; 342/81; 342/367; 342/368; 343/757; 343/824
(58) Field of Classification Search ............ 455/62, 455/63.4, 101, 269, 436, 442, 443, 450, 550.1, 455/562.1, 575.7, 277.1–278.1; 342/81, 342/154, 354, 367, 368; 343/757, 777, 824; 370/331, 332
See application file for complete search history.

(56) References Cited

U.S. PATENT DOCUMENTS

| | | | | |
|---|---|---|---|---|
| 3,846,799 | A | | 11/1974 | Gueguen ............ 343/833 |
| 5,905,473 | A | | 5/1999 | Taenzer ............ 343/834 |
| 5,966,384 | A | * | 10/1999 | Felix et al. ............ 370/465 |
| 6,229,486 | B1 | * | 5/2001 | Krile ............ 343/700 MS |
| 6,304,215 | B1 | * | 10/2001 | Proctor et al. ............ 342/372 |
| 6,370,369 | B1 | * | 4/2002 | Kraiem et al. ............ 455/277.1 |
| 6,404,386 | B1 | * | 6/2002 | Proctor et al. ............ 342/368 |
| 6,456,257 | B1 | * | 9/2002 | Zamat ............ 343/876 |
| 6,456,604 | B1 | * | 9/2002 | Lee et al. ............ 370/328 |

(Continued)

OTHER PUBLICATIONS

Ohira et al., Electronically Steerable Passive Array Radiator Antennas for Low-Cost Analog Adaptive Beamforming, 0-7803-6345-0/00, 2000, IEEE.

(Continued)

*Primary Examiner*—William Trost
*Assistant Examiner*—James Ewart
(74) *Attorney, Agent, or Firm*—Allen, Dyer, Doppelt, Milbrath & Gilchrist, P.A.

(57) ABSTRACT

Measurement opportunities are provided to a wireless transmit/receive unit (WTRU) operating with a switched beam antenna in a CDMA wireless communication system. The switched beam antenna is a smart antenna generating a plurality of directional beams and an omni-directional beam. The bursty nature of packet data transmission generates periods of inactivity or low traffic during a call. The WTRU switches to antenna beams other than the selected antenna beam for receiving and measuring signals during these periods of inactivity or low traffic. Moreover, if the network has knowledge of the fact the WTRU is operating using a switched beam antenna, the network can use this information when making decisions on channel allocations, thus providing frequent measurement opportunities to the WTRU in order to support the switched beam antenna operation.

16 Claims, 5 Drawing Sheets

U.S. PATENT DOCUMENTS

| | | | |
|---|---|---|---|
| 6,515,635 B2* | 2/2003 | Chiang et al. | 343/834 |
| 6,600,456 B2* | 7/2003 | Gothard et al. | 343/834 |
| 6,697,610 B1* | 2/2004 | Tait | 455/277.1 |
| 6,697,642 B1* | 2/2004 | Thomas | 455/562.1 |
| 6,725,062 B1* | 4/2004 | Paranchych | 455/561 |
| 6,771,622 B1* | 8/2004 | Banerjee | 370/331 |
| 6,834,190 B1* | 12/2004 | Lee et al. | 455/442 |
| 7,065,373 B2* | 6/2006 | Rodgers et al. | 455/502 |
| 7,136,483 B2* | 11/2006 | Khaleghi et al. | 379/448 |
| 2001/0024431 A1* | 9/2001 | Koo et al. | 370/335 |
| 2002/0071403 A1* | 6/2002 | Crowe et al. | 370/331 |
| 2002/0137538 A1* | 9/2002 | Chen et al. | 455/550 |
| 2003/0114172 A1* | 6/2003 | Soliman | 455/456 |
| 2003/0222818 A1* | 12/2003 | Regnier et al. | 342/383 |
| 2003/0228857 A1* | 12/2003 | Maeki | 455/278.1 |
| 2004/0023634 A1* | 2/2004 | Jeong et al. | 455/403 |
| 2004/0029534 A1* | 2/2004 | Odenwalder | 455/67.11 |
| 2004/0116110 A1* | 6/2004 | Amerga et al. | 455/422.1 |
| 2004/0127220 A1* | 7/2004 | Proctor, Jr. | 455/442 |

OTHER PUBLICATIONS

Scott et al., Diversity Gain From a Single-Port Adaptive Antenna Using Switched Parasitic Elements Illustrated with a Wire and Monopole Prototype, IEEE Transactions on Antennas and Propagation, vol. 47, No. 6, Jun. 1999.

King, The Theory of Linear Antennas, pp. 622-637, Harvard University Press, Cambridge, Mass., 1956.

Lo et al., Antenna Handbook: Theory, Applications and Design, pp. 21-38, Van Nostrand Reinhold Co., New York, 1988.

* cited by examiner

MEASUREMENT OPPORTUNITIES FOR A MOBILE UNIT OPERATING WITH A SWITCHED BEAM ANTENNA IN A CDMA SYSTEM

RELATED APPLICATION

This application claims the benefit of U.S. Provisional Application Ser. No. 60/541,968 filed Feb. 5, 2004, the entire contents of which are incorporated herein by reference.

FIELD OF THE INVENTION

The present invention relates to the field of wireless communications, and more particularly, to a mobile wireless transmit/receive unit (WTRU) operating with a switched beam antenna in a CDMA2000 wireless communication system.

BACKGROUND OF THE INVENTION

A switched beam system is a system where a number of fixed directional beams are defined and a transceiver selects the directional beam that provides the greatest signal quality and the least interference. The use of a directional beam with a wireless transmit/receive unit (WTRU) requires signal level measurements on each of the directional beams to select the best directional mode of the switched beam antenna.

The WTRU monitors the received signal level for each of the directional beams, and reselects the best directional beam to accommodate environment changes and movement of the WTRU. In a CDMA2000 system, measurements are performed in the forward pilot channel which is continuously transmitted by each cell.

While transmitting/receiving data is performed using the (best) selected antenna beam, the WTRU also performs measurements in the selected antenna beam. However, to insure that the best beam is being used, the WTRU needs to monitor other antenna beams during operation. Switching to another antenna beam to perform measurements may cause data loss. This is because the data transmission/reception in the other antenna beams will be affected by the antenna beam pattern. The difference between the antenna gain from beam to beam can be very high.

SUMMARY OF THE INVENTION

In view of the foregoing background, it is therefore an object of the present invention to provide guidelines as to when a wireless transmit/receive unit (WTRU) can perform measurements on switched antenna beams other than the selected antenna beam when operating in a CDMA2000 system.

This and other objects, features, and advantages in accordance with the present invention are provided by a method for performing measurements by a WTRU operating with a switched beam antenna in a CDMA2000 wireless communication system comprising a plurality of cells.

The switched beam antenna may be a smart antenna generating antenna beams including a plurality of directional beams and an omni-directional beam. The WTRU performs measurements during certain periods of inactivity or low traffic during a call. The WTRU switches to antenna beams other than the selected antenna beam for receiving and measuring signals during these periods of inactivity or low traffic. The present invention advantageously minimizes loss of packets when measuring signals received using the other switched antenna beams. This is accomplished by making the measurements when there is less data or no data at all being sent.

A first embodiment for the method for performing measurements is based upon operating the WTRU in an active state for exchanging data with at least one cell using a selected antenna beam. The data is being exchanged over an assigned fundamental channel, and if necessary, over an assigned supplemental channel. The method further comprises switching to antenna beams other than the selected antenna beam for receiving signals from the at least one cell when the supplemental channel is not assigned. The received signals are measured from the at least one cell for each switched antenna beam.

A second embodiment for the method for performing measurements is based upon operating the WTRU in an active state for exchanging data with at least one cell using a selected antenna beam, and the WTRU waiting to be placed in a control hold state to perform measurements in antenna beams other than the selected antenna beam. An assigned dedicated control channel is maintained with the at least one cell using the selected antenna beam when placed in the control hold state. The method further comprises switching to antenna beams other than the selected antenna beam for receiving signals from the at least one cell when the dedicated control channel is assigned. The received signals are measured from the at least one cell for each switched antenna beam. In addition, the switching and measuring may be performed when a reverse pilot channel is gated off.

A third embodiment for the method for performing measurements is based upon operating the WTRU with an assigned traffic channel for exchanging data with at least one cell using a selected antenna beam, and waiting to enter an uplink discontinuous transmission mode. The method further comprises switching to antenna beams other than the selected antenna beam for receiving signals from the at least one cell when in the uplink discontinuous transmission mode. The received signals are measured from the at least one cell for each switched antenna beam. In addition, the WTRU may monitor downlink traffic using the selected antenna beam, and the switching and the measuring in the antenna beams other than the selected antenna beam may be stopped if the monitoring exceeds a threshold.

A fourth embodiment for the method for performing measurements is based upon the WTRU using a selected antenna beam for exchanging data with at least one cell, with the exchanged data including information that the WTRU is operating with the switched beam antenna. The network coordinates channel allocations to allow for measurement opportunities in the WTRU based upon the information that the WTRU is operating with the switched beam antenna, and generates a command in response thereto. The WTRU receives the command from the network for operating the WTRU in a predetermined operating state for a predetermined time based. The WTRU switches to antenna beams other than the selected antenna beam for receiving signals from the at least one cell when in the predetermined operating state. The WTRU measures the received signals from the at least one cell for each switched antenna beam.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
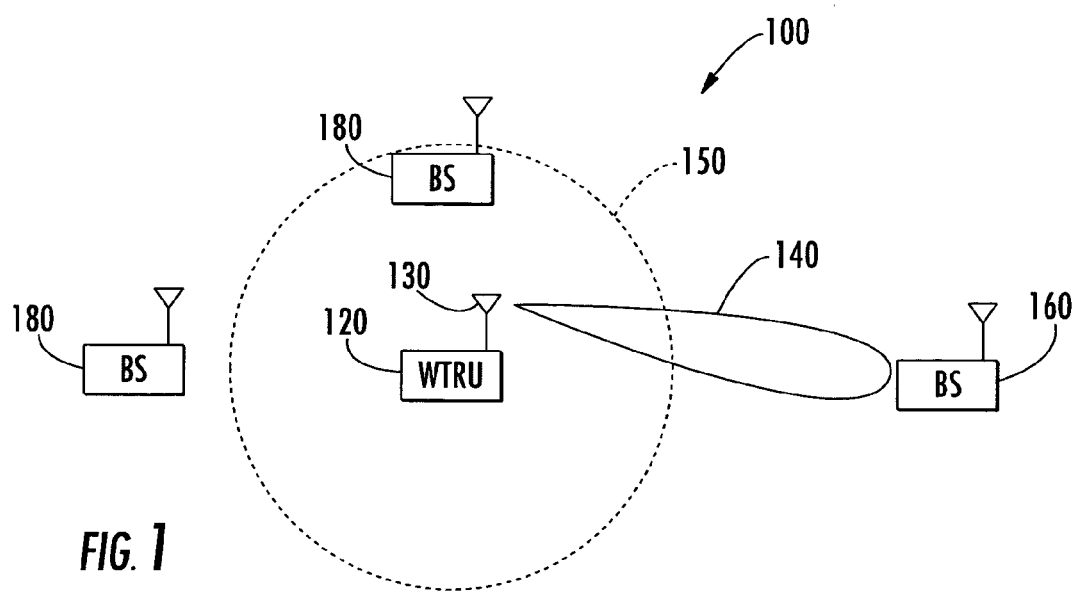
FIG. 1 is a schematic diagram of a CDMA200 wireless communication system and a wireless transmit/receive unit (WTRU) operating therein in accordance with the present invention.
Figure 2:
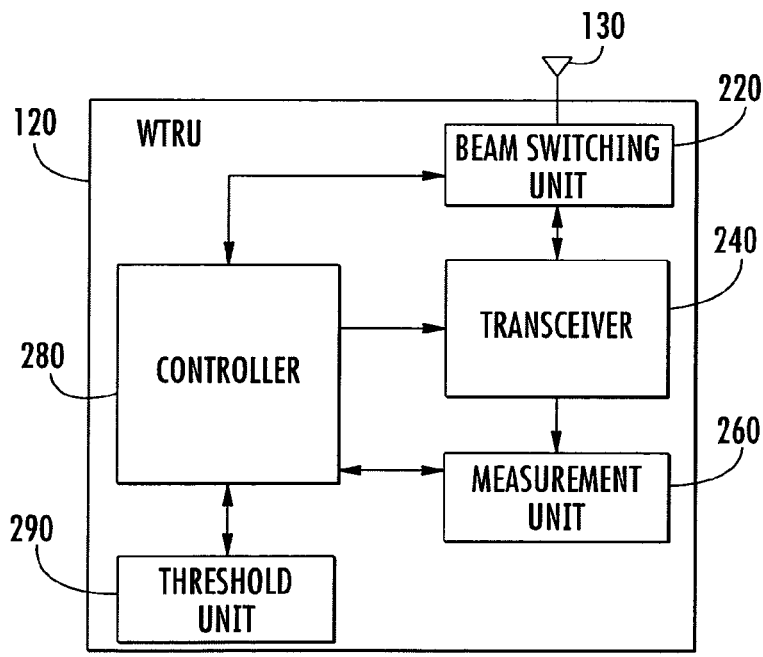
FIG. 2 is a block diagram of the WTRU illustrated in FIG. 1.

Referring initially to FIGS. 1 and 2, a wireless communications system 100 and a wireless transmit/receive unit (WTRU) 120 for operating in the wireless communication system will be discussed. The WTRU 120 includes a switched beam antenna 130 for generating antenna beams including a plurality of directional beams 140 and an omni-directional beam 150. The illustrated directional beam 140 is a switched beam for communicating with base station 160, which is also the serving cell. The WTRU 120 is also in the vicinity of neighboring base stations 180.

The base stations 160, 180 may be site controllers, access points or any other type of interfacing devices in a wireless environment as readily appreciated by those skilled in the art. The wireless communication system 100 is applicable, for example, to a code division multiple access (CDMA) 2000 system, and to CDMA in general, as readily appreciated by those skilled in the art.

The WTRU 120 includes devices capable of operating in a wireless environment, such as user equipment (UE), mobile stations, mobile subscriber units and pagers, for example. The WTRU 120 comprises a beam switching unit 220 connected to the switched beam antenna 130, a transceiver 240 connected to the beam switching unit, and a measurement unit 260 connected to the transceiver, as illustrated in FIG. 2. The measurement unit 260 measures the signals received from the different cells. For a CDMA2000 system, pilot signals are preferably used for these measurements. However, any other signals transmitted from the cells may be used for this purpose.

A controller 280 is connected to the transceiver 240, to the measurement unit 260, and to the beam switching unit 220 for control thereof. A threshold unit 290 is also connected to the controller 280. The threshold unit 290 may comprise a memory for storing threshold values used for comparison with the measurements performed by the measurement unit 260.

Figure 3:
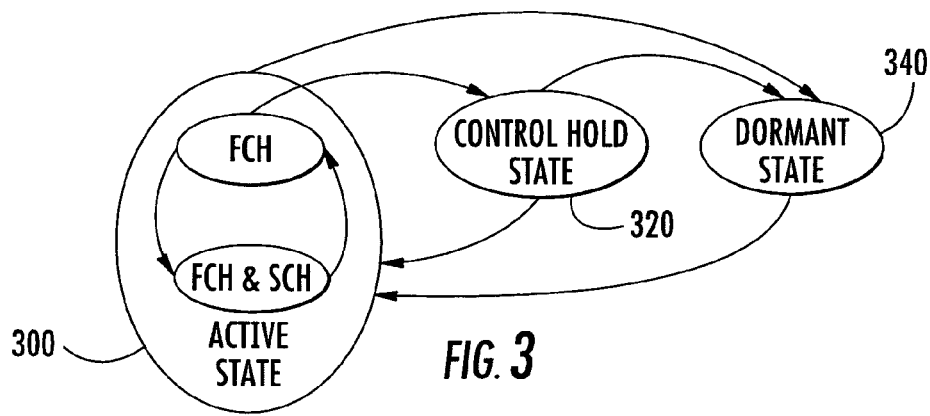
FIG. 3 is a schematic diagram illustrating the MAC transition states for the CDMA200 wireless communication system illustrated in FIG. 1.

A schematic diagram illustrating the MAC transition states for the CDMA2000 wireless communication system is provided in FIG. 3. The MAC activity is represented by the following states: active state 300, control hold state 320, and dormant state 340.

In the active state 300 a fundamental channel (FCH) and/or a supplemental channel (SCH) is assigned to the WTRU 120, and a link layer and a point-to-point protocol (PPP) connection is established between the IWF and the MS.

In the control hold state 320 only a dedicated control channel is maintained between the WTRU 120 and the base station 160. Control commands can be sent with low latency. Power control is maintained in this state to minimize the latency of starting high speed data transmissions due to power control convergence. No data traffic is allowed, and a very fast traffic channel reassignment is generally performed when necessary. The reverse pilot channel may be gated in this state.

In the dormant state 340, no dedicated channels are maintained. The state information for PPP is maintained. That is, the WTRU 120 is registered.

Before discussing the measurement opportunities for the WTRU 120 and coordination with the base station 160 in accordance with the present invention, the CDMA2000 traffic channel will first be discussed as background information. The traffic channel in a CDMA2000 system always includes a fundamental channel and/or a dedicated control channel. The traffic channel may also include one or more supplemental channels.

The fundamental channel supports voice, data or signaling. The dedicated control channel supports signaling or bursty data. The supplemental channel supports high data rate services.

Fundamental channels and dedicated control channels are channels with continuous allocation (infinite duration). Supplemental channels can be continuous or can be assigned with a duration specified, and the channel is released after the duration expires.

In general, the WTRU 120 is assigned a fundamental channel and/or a dedicated control channel when the call is originated. Then the network monitors activity of the WTRU 120 and channel conditions and decides on the supplemental channel allocations. The WTRU 120 has the ability to request a supplemental channel allocation.

Several parameters are taken into account by the network when assigning a channel to a WTRU 120, such as the user's activity (amount of data to send), user path-loss, interference, and cell load.

When a supplemental channel is assigned, an activation time and a duration may be defined. The channel is available to the WTRU 120 at the activation time and remains available to that user for the duration specified. After that the channel is released and may be assigned to another WTRU. There is no signaling required to release the channel. The supplemental channel can also be assigned with infinite duration, in which case the network must send a specific message to the WTRU 120 to release the channel.

Four different embodiments for measurement opportunities to be performed by the WTRU 120 and coordination with the network will now be discussed with reference to the flow diagrams illustrated in FIGS. 4-7.

The bursty nature of packet data transmission will generate periods of inactivity during a call. Moreover, there are periods where the data rates are very high (e.g., when both fundamental and supplemental channels are assigned) and periods where the data rates are very low (e.g., fundamental channel only is assigned). There are also periods where only signaling/control is being sent (i.e., control hold mode).

Figure 4:
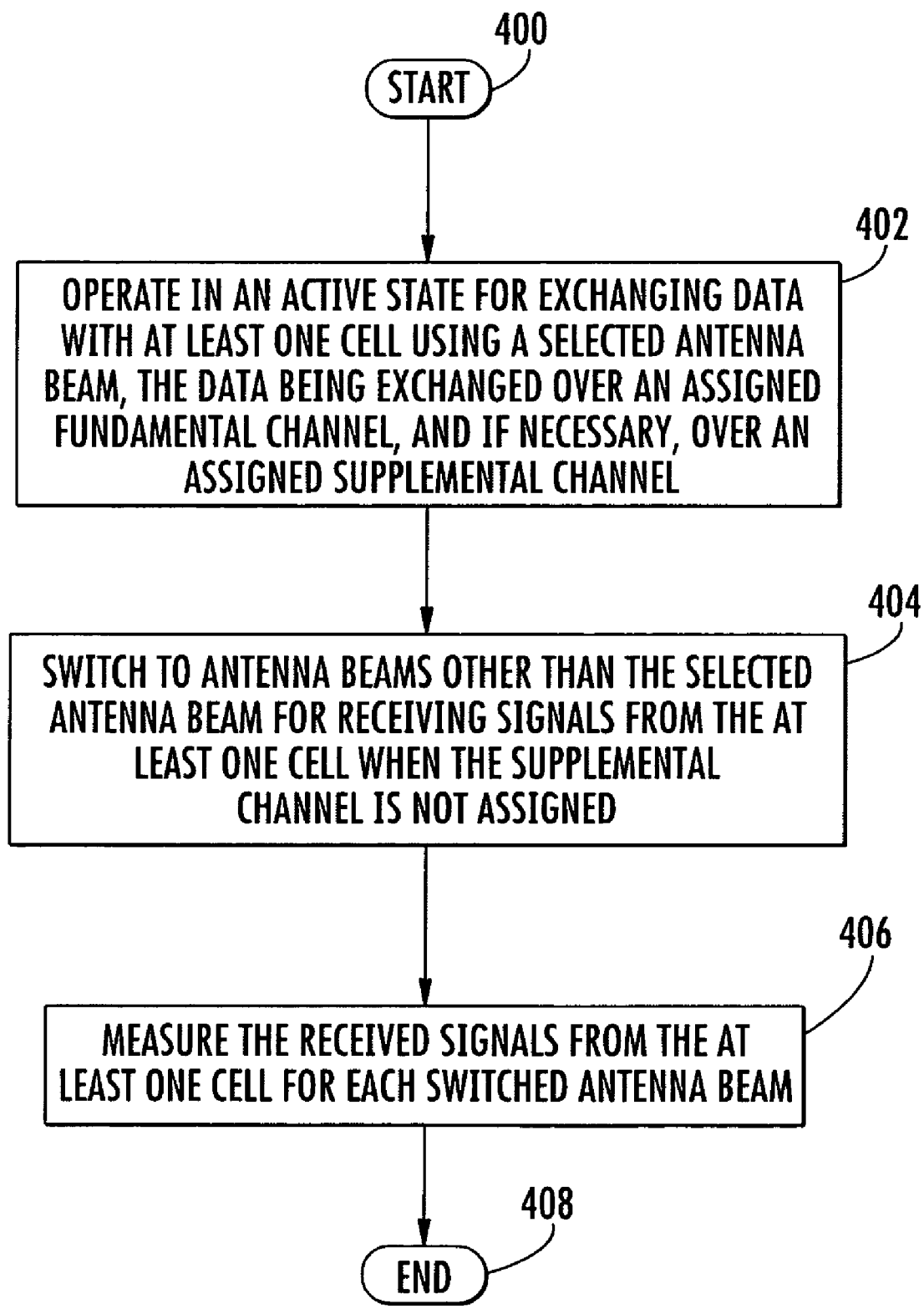
FIGS. 4-7 are flow diagrams of respective embodiments for performing measurements by the WTRU illustrated in FIG. 1.

The first embodiment for performing measurements by the WTRU 120 operating with a switched beam antenna 130 is illustrated in the flow diagram in FIG. 4. From the start (Block 400), the WTRU 120 is operating in an active state for exchanging data with at least one cell 160 using a selected antenna beam at Block 402. The data is exchanged over an assigned fundamental channel, and if necessary, over an assigned supplemental channel.

The method further comprises switching to antenna beams other than the selected antenna beam for receiving signals from the at least one cell when the supplemental channel is not assigned at Block 404. The received signals are measured from the at least one cell for each switched antenna beam at Block 406.

The WTRU 120 thus performs switched beam measurements when the supplemental channel is not assigned because the data rate is lower, and the number of bits that can be lost during the antenna beam switching is smaller. The method ends at Block 408.

The measuring, for example, may comprises measuring at least one of a signal-to-interference ratio, a signal-to-noise ratio and a signal strength of the received signals. The objective of measuring the received signals is to determine a quality of the link so that a determination can be made as to whether to remain at the selected antenna beam, or switch to another antenna beam that provides a better link quality. For a CDMA2000 system the received signals are pilot signals.

Figure 5:
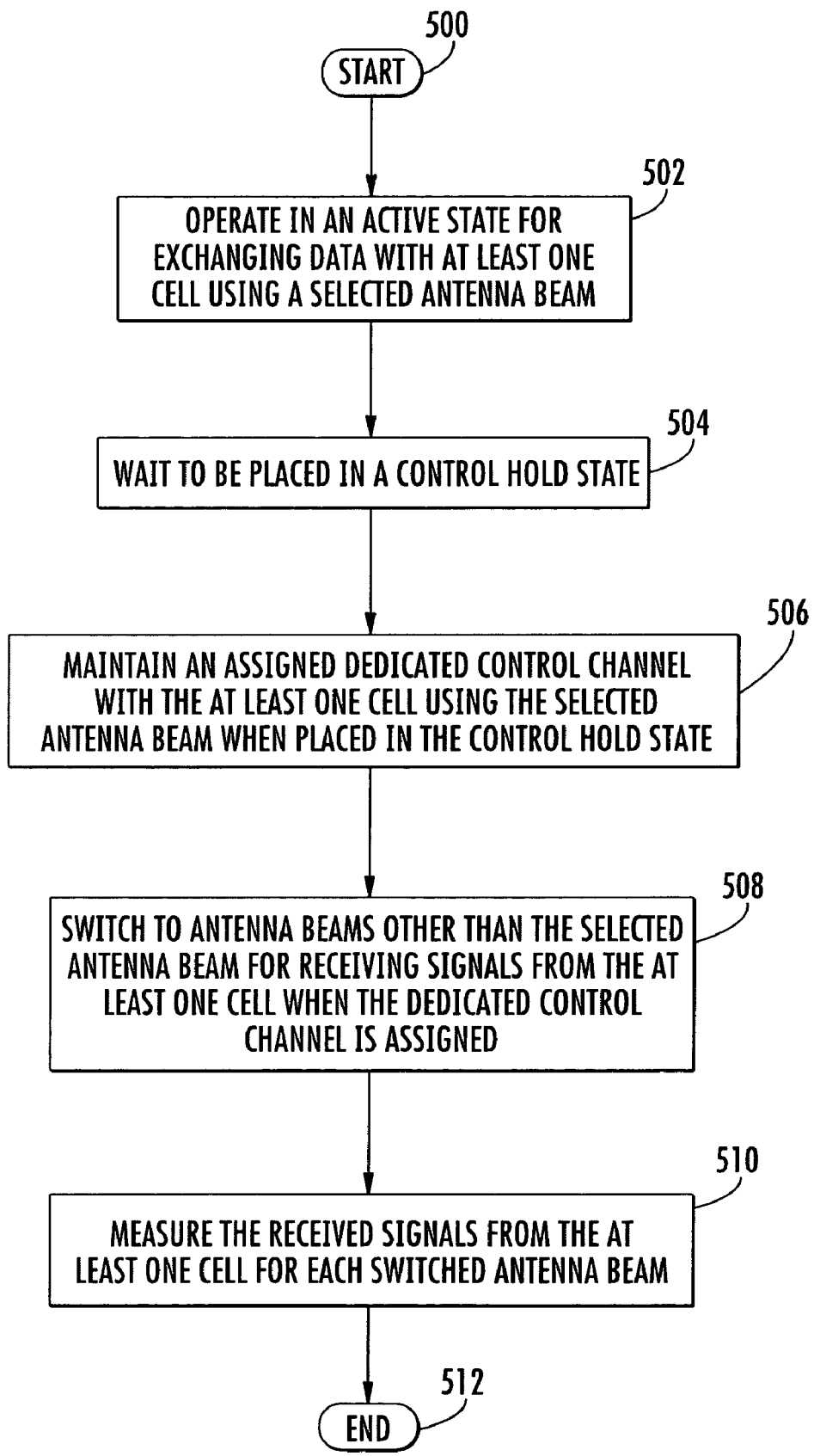

The second embodiment for performing measurements by the WTRU 120 operating with a switched beam antenna 130 is illustrated in the flow diagram in FIG. 5. From the start (Block 500), the WTRU 120 is operated in an active state for exchanging data with at least one cell 160 using a selected antenna beam at Bock 502. The WTRU 120 is then waiting to be placed in a control hold state at Block 504.

The method further comprises maintaining an assigned dedicated control channel with the at least one cell using the selected antenna beam when placed in the control hold state at Block 506. The WTRU 120 switches to antenna beams other than the selected antenna beam for receiving signals from the at least one cell 160 when the dedicated control channel is assigned at Block 508. The received signals are measured from the at least one cell for each switched antenna beam at Block 510. In addition, the switching and measuring may be performed when a reverse pilot channel is gated off, as readily appreciated by those skilled in the art. The method ends at Block 512.

Figure 6:
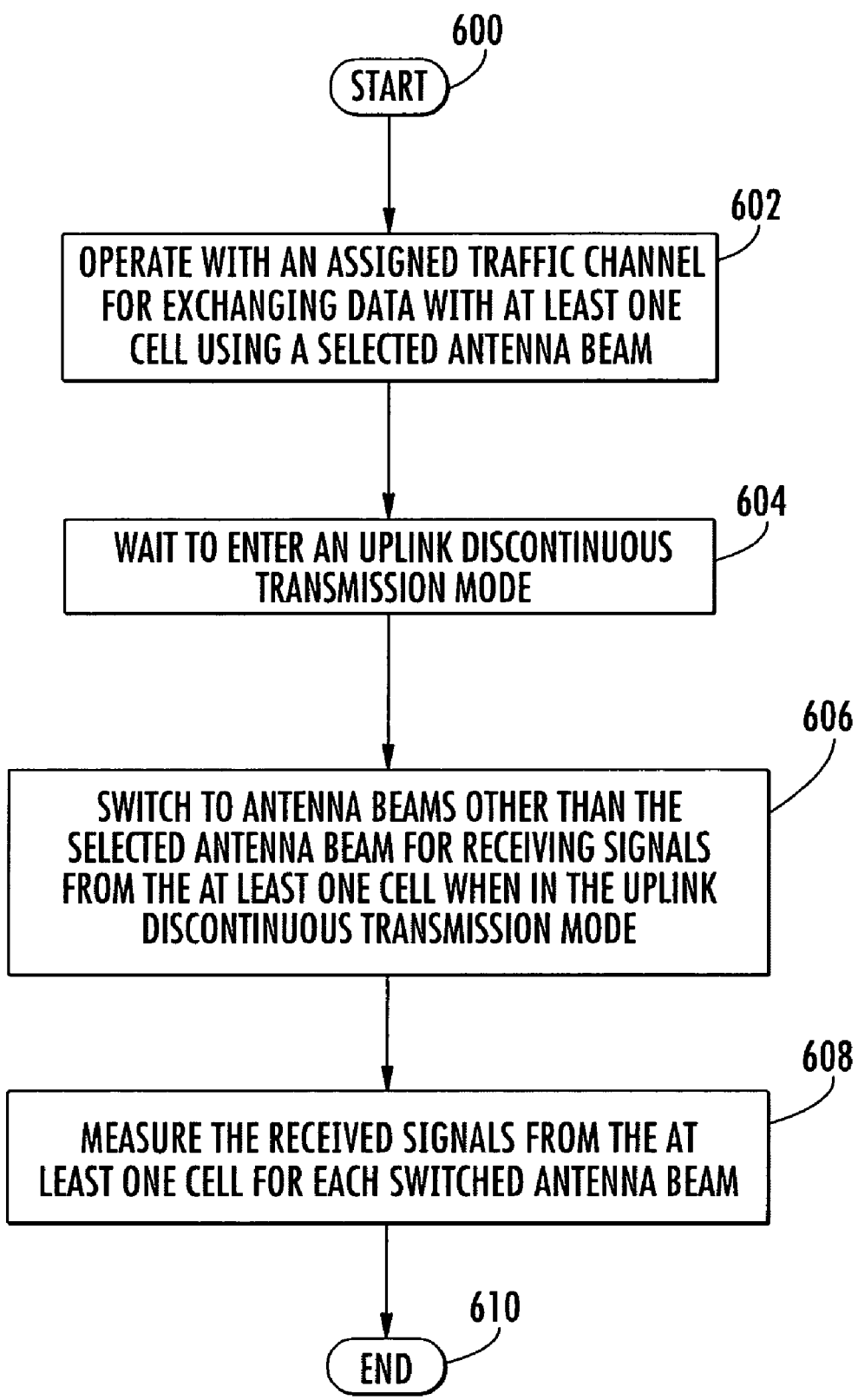

The third embodiment for performing measurements by the WTRU 120 operating with a switched beam antenna 130 is illustrated in the flow diagram in FIG. 6. The WTRU 120 and/or the base station 160 may each discontinue transmission for a certain period of time. This feature is called DTX—discontinuous transmission. The DTX decision is made on a frame by frame basis, and the WTRU 120 does not know when the downlink will be in DTX. The WTRU 120 can use its own DTX (in the uplink) as a guideline to perform measurements (perform measurements while in DTX in the uplink).

However, the fact that the uplink is in DTX does not imply that the downlink is in DTX. So, when following this guideline the WTRU 120 also takes into consideration the downlink traffic, and preferably performs measurements when the traffic load in the downlink is light.

From the start (Block 600), the WTRU 120 is operating with an assigned traffic channel for exchanging data with at least one cell 160 using a selected antenna beam at Block 602, and waits to enter an uplink discontinuous transmission mode at Block 604.

The method further comprises switching to antenna beams other than the selected antenna beam for receiving signals from the at least one cell 160 when in the uplink discontinuous transmission mode at Block 606. The received signals are measured from the at least one cell for each switched antenna beam at Block 608.

In addition, downlink traffic using the selected antenna beam may be monitored, and the switching and the measuring in the antenna beams other than the selected antenna beam can be stopped if the monitoring exceeds a threshold. The method ends at Block 610.

Figure 7:
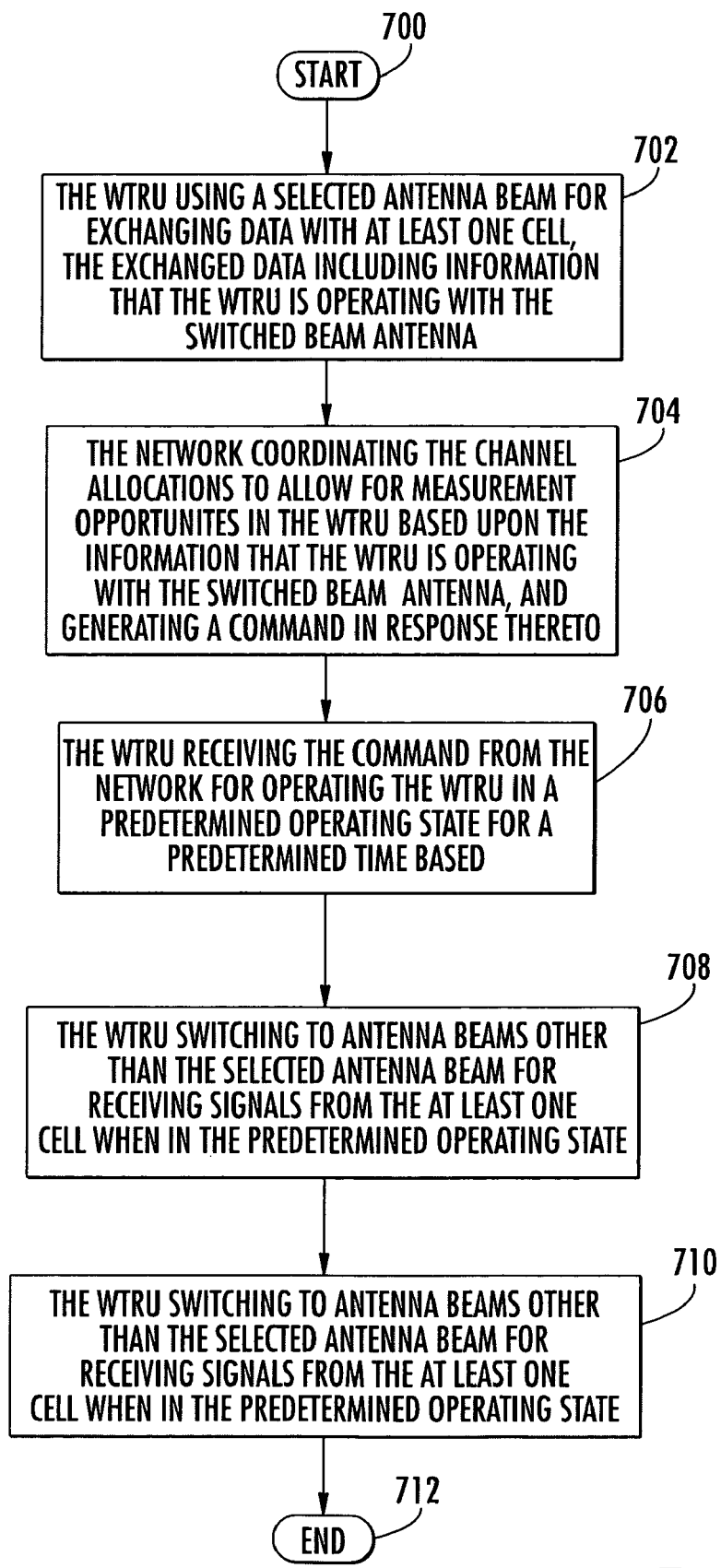

The fourth embodiment for performing measurements by the WTRU 120 operating with a switched beam antenna 130 is illustrated in the flow diagram in FIG. 7. From the start (Block 700), the WTRU 120 uses a selected antenna beam for exchanging data with at least one cell 160 at Block 702. The exchanged data includes information that the WTRU 120 is operating with the switched beam antenna 130.

The network coordinating the channel allocations to allow for measurement opportunities in the WTRU 120 is based upon the information that the WTRU is operating with the switched beam antenna, and generates a command in response thereto at Block 704. The command is received by the WTRU 120 at Block 706 for operating in a predetermined operating state for a predetermined time.

The method further comprises switching to antenna beams other than the selected antenna beam for receiving signals from the at least one cell 160 when in the predetermined operating state at Block 708. The received signals are measured from the at least one cell for each switched antenna beam at Block 710.

The predetermined operating state may comprise an active state 300 that includes an assigned fundamental channel without a supplemental channel being assigned as described above. The predetermined operating state may also comprise the control hold state 320 as discussed above. The WTRU 120 is periodically placed in the predetermined operating state.

In general, several parameters are taken into account by the network when assigning a channel to a WTRU 120, such as the user's activity (amount of data to send), user path loss, interference and cell load. If the network is aware of the presence of a switch beam antenna 130 in the WTRU 120, then the network can also use this information to coordinate the channel allocations, and allow for measurement opportunities in the WTRU to support a beam switching operation. This advantageously allows some idle periods for the WTRU 120 to perform the measurements, thus increasing the measurements opportunities. For example, the network sends the WTRU 120 the control hold state 320 at a certain periodicity, allowing for measurements to be performed. This is possible due to the fact that data transmission is not too sensitive delay. The method ends at Block 712.

The present invention advantageously minimizes loss of packets when measuring signals received using the other switched antenna beams other than the selected antenna beam. This is accomplished by making the measurements when there is less data or no data at all being sent.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for performing measurements by a wireless transmit/receive unit (WTRU) operating with a switched beam antenna in a CDMA wireless communication system comprising a plurality of cells, the switched beam antenna for generating antenna beams including a plurality of directional beams and an omni beam, the method comprising:
   operating in an active state for exchanging data with at least one cell using a selected antenna beam;
   waiting to be placed in a control hold state;
   maintaining an assigned dedicated control channel with the at least one cell using the selected antenna beam when placed in the control hold state;
   switching to antenna beams other than the selected antenna beam for receiving signals from the at least one cell when the dedicated control channel is assigned;
   measuring the received signals from the at least one cell for each switched antenna beam; and
   the switching and measuring being performed when a reverse pilot channel is gated off.

2. A method according to claim 1, further comprising selecting an antenna beam based upon the measured signals.

3. A method according to claim 1, wherein the received signals being measured comprise pilot signals.

4. A method according to claim 1, wherein the measuring comprises measuring at least one of a signal-to-interference ratio, a signal-to-noise ratio and a signal strength of the received signals.

5. A method for performing measurements by a wireless transmit/receive unit (WTRU) operating with a switched beam antenna in a CDMA wireless communication system comprising a plurality of cells, the switched beam antenna for generating antenna beams including a plurality of directional beams and an omni beam, the method comprising:
   operating with an assigned traffic channel for exchanging data with at least one cell using a selected antenna beam;
   waiting to enter an uplink discontinuous transmission mode;
   switching to antenna beams other than the selected antenna beam for receiving signals from the at least one cell when in the uplink discontinuous transmission mode; and
   measuring the received signals from the at least one cell for each switched antenna beam;
   monitoring downlink traffic using the selected antenna beam; and
   stopping the switching and the measuring in the antenna beams other than the selected antenna beam if the monitoring exceeds a threshold.

6. A method according to claim 5, further comprising selecting an antenna beam based upon the measured signals.

7. A method according to claim 5, wherein the received signals being measured comprise pilot signals.

8. A method according to claim 5, wherein the measuring comprises measuring at least one of a signal-to-interference ratio, a signal-to-noise ratio and a signal strength of the received signals.

9. A method for performing channel allocations for a wireless transmit/receive unit (WTRU) operating with a switched beam antenna in a CDMA wireless communication system comprising a plurality of cells, the switched beam antenna for generating antenna beams including a plurality of directional beams and an omni beam, the method comprising:
   the WTRU using a selected antenna beam for exchanging data with at least one cell, the exchanged data including information that the WTRU is operating with the switched beam antenna;
   the network coordinating the channel allocations to allow for measurement opportunities in the WTRU based upon the information that the WTRU is operating with the switched beam antenna, and generating a command in response thereto;
   the WTRU receiving the command from the network for operating the WTRU in a predetermined operating state for a predetermined time;
   the WTRU switching to antenna beams other than the selected antenna beam for receiving signals from the at least one cell when in the predetermined operating state; and
   the WTRU measuring the received signals from the at least one cell for each switched antenna beam.

10. A method according to claim 9, wherein the predetermined operating state comprises an active state in which data is exchanged with the at least one cell over an assigned fundamental channel, and a supplemental channel is not assigned.

11. A method according to claim 9, wherein the predetermined operating state comprises a control hold state in which an assigned dedicated control channel is maintained with the at least one cell using the selected antenna beam.

12. A method according to claim 11, wherein the switching and measuring is performed when a reverse pilot channel is gated off.

13. A method according to claim 9, wherein the WTRU is periodically placed in the predetermined operating state.

14. A method according to claim 9, further comprising selecting an antenna beam based upon the measured signals.

15. A method according to claim 9, wherein the received signals being measured comprise pilot signals.

16. A method according to claim 9, wherein the measuring comprises measuring at least one of a signal-to-interference ratio, a signal-to-noise ratio and a signal strength of the received signals.

* * * * *

UNITED STATES PATENT AND TRADEMARK OFFICE
CERTIFICATE OF CORRECTION

PATENT NO.       : 7,340,254 B2                                   Page 1 of 1
APPLICATION NO.  : 11/051016
DATED            : March 4, 2008
INVENTOR(S)      : Iacono It is certified that error appears in the above-identified patent and that said Letters Patent is hereby corrected as shown below:

Column 2, Line 63    Delete: "time based."
                     Insert: -- time. --

Column 3, Line 3     Delete: "CDMA200"
                     Insert: -- CDMA2000--

Column 3, Line 10    Delete: "CDMA200"
                     Insert: -- CDMA2000--

Column 5, Line 21    Delete: "comprises"
                     Insert: -- comprise --

Column 5, Line 35    Delete: "Bock"
                     Insert: -- Block --

Column 6, Line 57    Delete: "sensitive delay"
                     Insert: -- sensitive to a delay --

Signed and Sealed this

Ninth Day of September, 2008

JON W. DUDAS
*Director of the United States Patent and Trademark Office*